United States Patent
Lee et al.

(10) Patent No.: US 9,732,969 B2
(45) Date of Patent: Aug. 15, 2017

(54) EVAPORATIVE HUMIDIFIER AND CONTROL METHOD THEREOF

(71) Applicant: SAMSUNG ELECTRONICS CO., LTD., Suwon-si, Gyeonggi-do (KR)

(72) Inventors: Sang Hoon Lee, Yeoju-si (KR); Jeong Myeong Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 104 days.

(21) Appl. No.: 14/561,389

(22) Filed: Dec. 5, 2014

(65) Prior Publication Data

US 2015/0330643 A1 Nov. 19, 2015

(30) Foreign Application Priority Data

May 13, 2014 (KR) ........................ 10-2014-0057153

(51) Int. Cl.
| | |
|---|---|
| *F24F 6/06* | (2006.01) |
| *F24F 6/04* | (2006.01) |
| *C02F 1/32* | (2006.01) |
| *F24F 6/00* | (2006.01) |
| *F24F 3/16* | (2006.01) |

(52) U.S. Cl.
CPC ................ *F24F 6/06* (2013.01); *C02F 1/325* (2013.01); *F24F 6/04* (2013.01); *C02F 2201/32* (2013.01); *C02F 2303/04* (2013.01); *C02F 2307/12* (2013.01); *F24F 2003/1667* (2013.01); *F24F 2006/006* (2013.01); *F24F 2006/008* (2013.01)

(58) Field of Classification Search
CPC ........................................................ C02F 1/32
See application file for complete search history.

(56) References Cited

U.S. PATENT DOCUMENTS

| | | | | | |
|---|---|---|---|---|---|
| 4,106,914 | A | * | 8/1978 | Kun-Ming | ................ F17C 7/04 116/300 |
| 4,630,475 | A | * | 12/1986 | Mizoguchi | ................ F24F 6/00 261/1 |
| 5,859,952 | A | * | 1/1999 | Levine | ...................... F24F 1/02 239/102.1 |
| 6,220,579 | B1 | * | 4/2001 | Chen | ...................... F22B 1/284 261/131 |
| 7,396,459 | B2 | * | 7/2008 | Thorpe | ................... C02F 1/325 210/205 |
| 8,800,970 | B2 | * | 8/2014 | Heine | ................... A61M 16/16 128/204.17 |
| 2002/0014866 | A1 | * | 2/2002 | Cooper | ................. H05B 37/00 315/291 |

(Continued)

FOREIGN PATENT DOCUMENTS

| | | |
|---|---|---|
| KR | 10-2007-0017800 | 2/2007 |
| KR | 10-0912143 | 8/2009 |
| KR | 10-2009-0099322 | 9/2009 |

*Primary Examiner* — Amber R Orlando
*Assistant Examiner* — Stephen Hobson
(74) *Attorney, Agent, or Firm* — Staas & Halsey & LLP

(57) ABSTRACT

An evaporative humidifier including a water bucket, a tub configured to accommodate water introduced from the water bucket, a humidifying element configured to execute humidification by receiving the water accommodated in the tub and evaporating the received water, and an ultraviolet ray emitting part provided on the tub to emit ultraviolet rays to the tub.

14 Claims, 16 Drawing Sheets

(56) References Cited

U.S. PATENT DOCUMENTS

| | | | |
|---|---|---|---|
| 2007/0241288 A1* | 10/2007 | Wang | C02F 1/325 |
| | | | 250/436 |
| 2009/0145509 A1* | 6/2009 | Baker | A61J 1/2089 |
| | | | 141/2 |
| 2010/0133707 A1* | 6/2010 | Huang | A61L 9/20 |
| | | | 261/81 |
| 2013/0154134 A1* | 6/2013 | Lev | F24F 6/12 |
| | | | 261/141 |
| 2013/0175711 A1 | 7/2013 | Nutter et al. | |

* cited by examiner

EVAPORATIVE HUMIDIFIER AND CONTROL METHOD THEREOF

CROSS-REFERENCE TO RELATED APPLICATIONS

This application claims the benefit of Korean Patent Application No. 10-2014-0057153, filed on May 13, 2014, in the Korean Intellectual Property Office, the disclosure of which is incorporated herein by reference.

BACKGROUND

1. Field

Embodiments of the present disclosure relate to an evaporative humidifier which produces humidification by naturally evaporating water, and a control method thereof.

2. Description of the Related Art

In general, a humidifier is used to maintain indoor humidity at a proper level and prevent various respiratory diseases.

The conventional humidifier is classified into a thermal humidifier, an ultrasonic humidifier and a combination type humidifier depending on the humidification method. In recent years, an evaporative humidifier using evaporation of water has been developed and widely used.

The evaporative humidifier executes humidification in a way to evaporate water molecules, by allowing indoor air to pass through a filter, which absorbs water stored in a tub, and then to be discharged to the indoor space again.

Meanwhile, with the increased attention on respiratory heath, a humidifier provided with antibacterial and sterilization functions has garnered a large amount of interest.

SUMMARY

Therefore, it is an aspect of the present disclosure to provide an evaporative humidifier provided with an ultraviolet ray emitting part and a control method thereof.

Additional aspects and/or advantages will be set forth in part in the description which follows and, in part, will be apparent from the description, or may be learned by practice of the invention.

In accordance with an embodiment of the present disclosure, an evaporative humidifier includes a water bucket, a tub, a humidifying element and an ultraviolet ray emitting part. The tub may be configured to accommodate water introduced from the water bucket. The humidifying element may be configured to execute humidification by receiving the water accommodated in the tub and evaporating the received water. The ultraviolet ray emitting part may be provided on the tub to emit ultraviolet rays to the tub.

The ultraviolet ray emitting part may be provided at a position lower than a water level of the water accommodated in the tub.

The ultraviolet ray emitting part may be provided on a lower surface of the tub.

The tub may be provided at an inside lower surface thereof with an opening to accommodate the ultraviolet ray emitting part, and the ultraviolet ray emitting part may further include a water blocking part formed to correspond to the opening, the water blocking part allowing the ultraviolet rays to pass therethrough and preventing the water accommodated in the tub from being introduced into the ultraviolet ray emitting part.

The water blocking part may be provided in a plate shape to form the inside lower surface of the tub by being coupled to the opening.

The water blocking part may be provided in a protruding shape protruding inward the tub.

The water blocking part may be provided in a protruding tube shape protruding inward the tub.

The opening may be provided in a circular shape, and the water blocking part may be provided in a cylinder shape, so that the water blocking part is screw-coupled to the opening.

The opening may include a mounting part having a step and extending to an inner side of the opening such that the water blocking part is mounted on the mounting part. The ultraviolet ray emitting part may further include a water leakage preventing part configured to prevent water from leaking between a gap between the mounting part and the water blocking part. The mounting part may be configured to prevent the ultraviolet rays from being directly emitted to the water leakage preventing part.

The tub may include a partition part configured to partition a water supply space to which water is supplied from the water bucket from a water storage space configured to supply water to the humidifying element.

The ultraviolet ray emitting part may emit ultraviolet rays to at least one of the water supply space and the water storage space.

The ultraviolet ray emitting part may be provided adjacent to the partition part.

The ultraviolet ray emitting part may further include an ultraviolet lamp and a power converting part configured to supply an alternating current power to the ultraviolet lamp.

The ultraviolet ray emitting part may further include at least one ground terminal configured to prevent a short circuit.

The evaporative humidifier may further include a control part configured to control the ultraviolet ray emitting part such that ultraviolet rays are emitted to the water accommodated in the tub before a humidification operation of the evaporative humidifier starts.

The evaporative humidifier may further include a control part configured to control the ultraviolet ray emitting part such that ultraviolet rays are emitted to the water accommodated in the tub after a humidification operation of the evaporative humidifier is completed.

The evaporative humidifier may further include a control part configured to control the ultraviolet ray emitting part such that ultraviolet rays are emitted to the water accommodated in the tub at a constant interval during a humidification operation of the evaporative humidifier.

In accordance with another aspect of the present disclosure, an evaporative humidifier includes an ultraviolet lamp, a tub and an accommodating part. The ultraviolet lamp may be configured to generate ultraviolet rays. The tub may be configured to accommodate water at a predetermined water level. The accommodating part may be provided at a position lower than the water level and configured to allow the ultraviolet lamp to be accommodated therein. The water blocking part may be provided between the tub and the accommodating part to prevent water of the tub from being introduced to the inside of the accommodating part.

As is apparent from the above, the evaporative humidifier and the control method thereof can ensure hygienic humidification.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
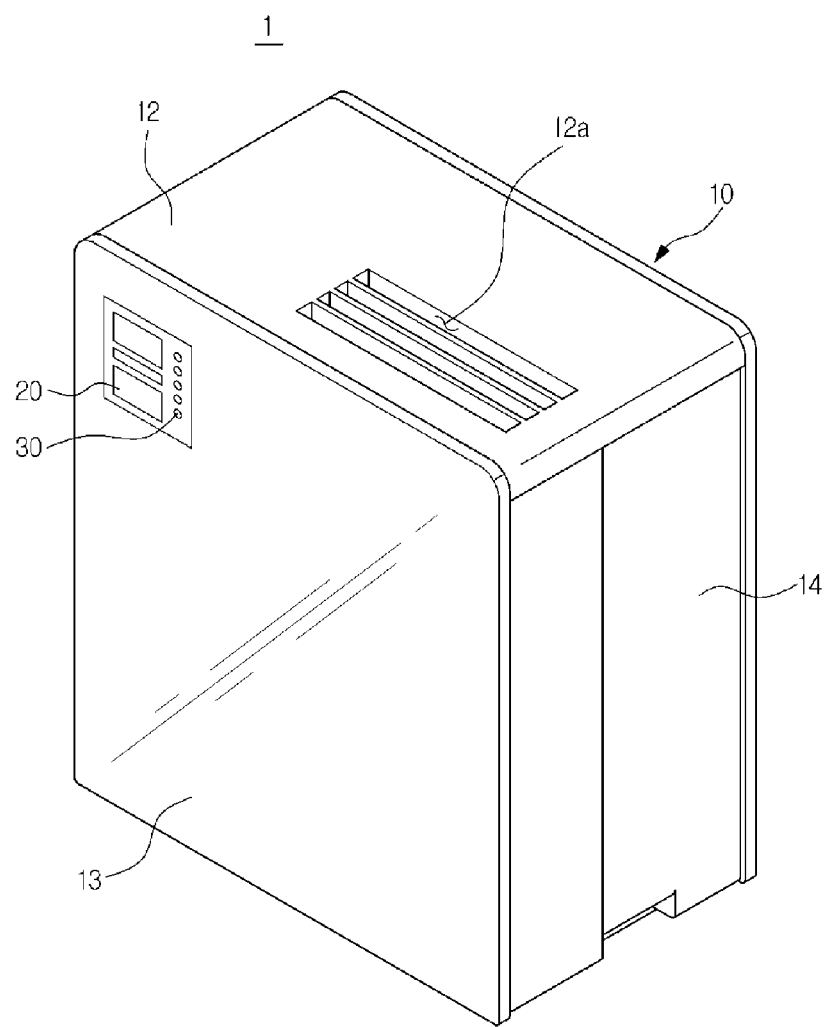
FIG. 1 is a front side perspective view illustrating an evaporative humidifier according to an embodiment of the present disclosure.

Reference will now be made in detail to the embodiments of the present disclosure, examples of which are illustrated in the accompanying drawings, wherein like reference numerals refer to like elements throughout.

An evaporative humidifier is largely classified into two types depending on a scheme of receiving water. As for the first example, an evaporative humidifier is provided such that a filter formed of high absorbent material, such as rayon is directly submerged in water accommodated in a tub so as to directly absorb water contained in a tub. As for the second example, an evaporative humidifier is provided such that a filter is supplied with water which is drawn by a water pocket provided on a humidifying element. For the convenience of description, the following description will be made on the evaporative humidifier according to the second example, but the present disclosure is not limited thereto and may be applied to the evaporative humidifier according to the first example.

Hereinafter, a structure and an operation of an evaporative humidifier according to an embodiment of the present disclosure will be described with reference to the accompanying drawings.

Figure 2:
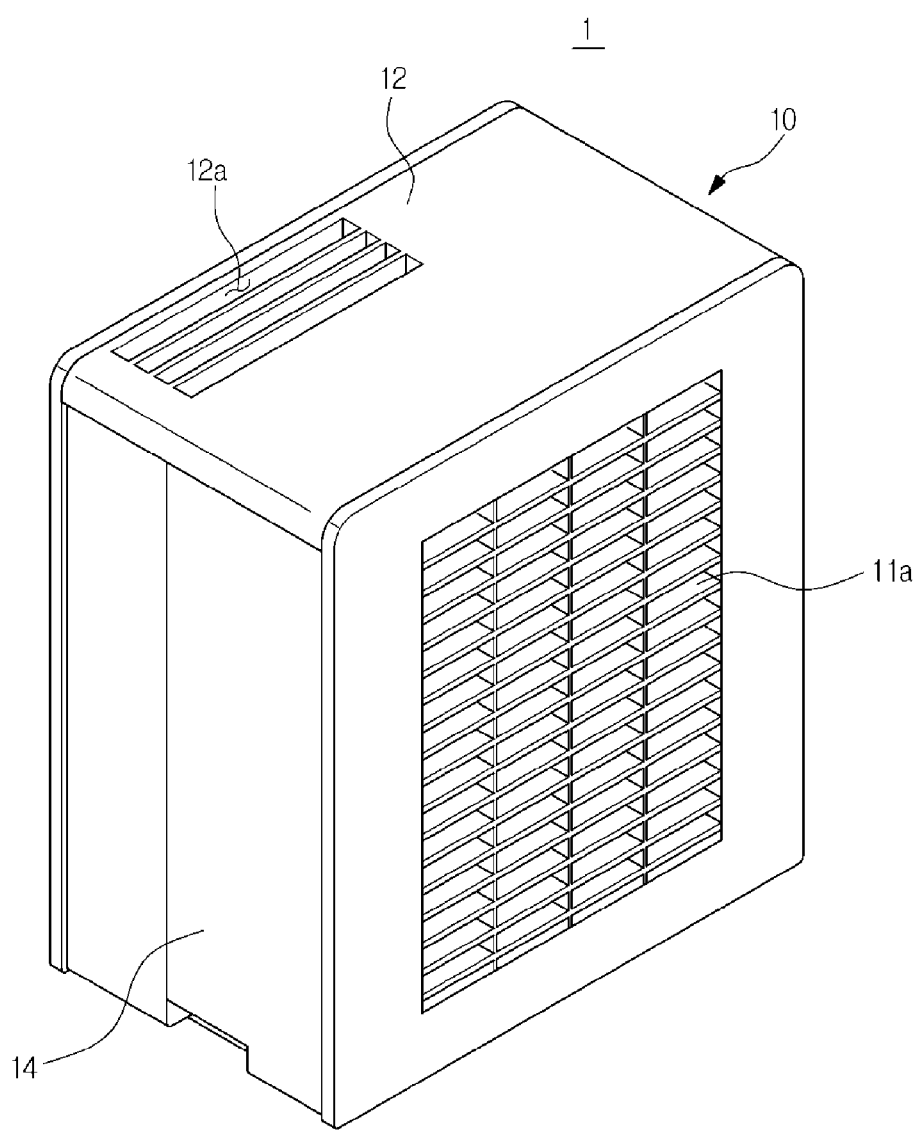
FIG. 2 is a rear side perspective view illustrating the evaporative humidifier of FIG. 1.
Figure 3:
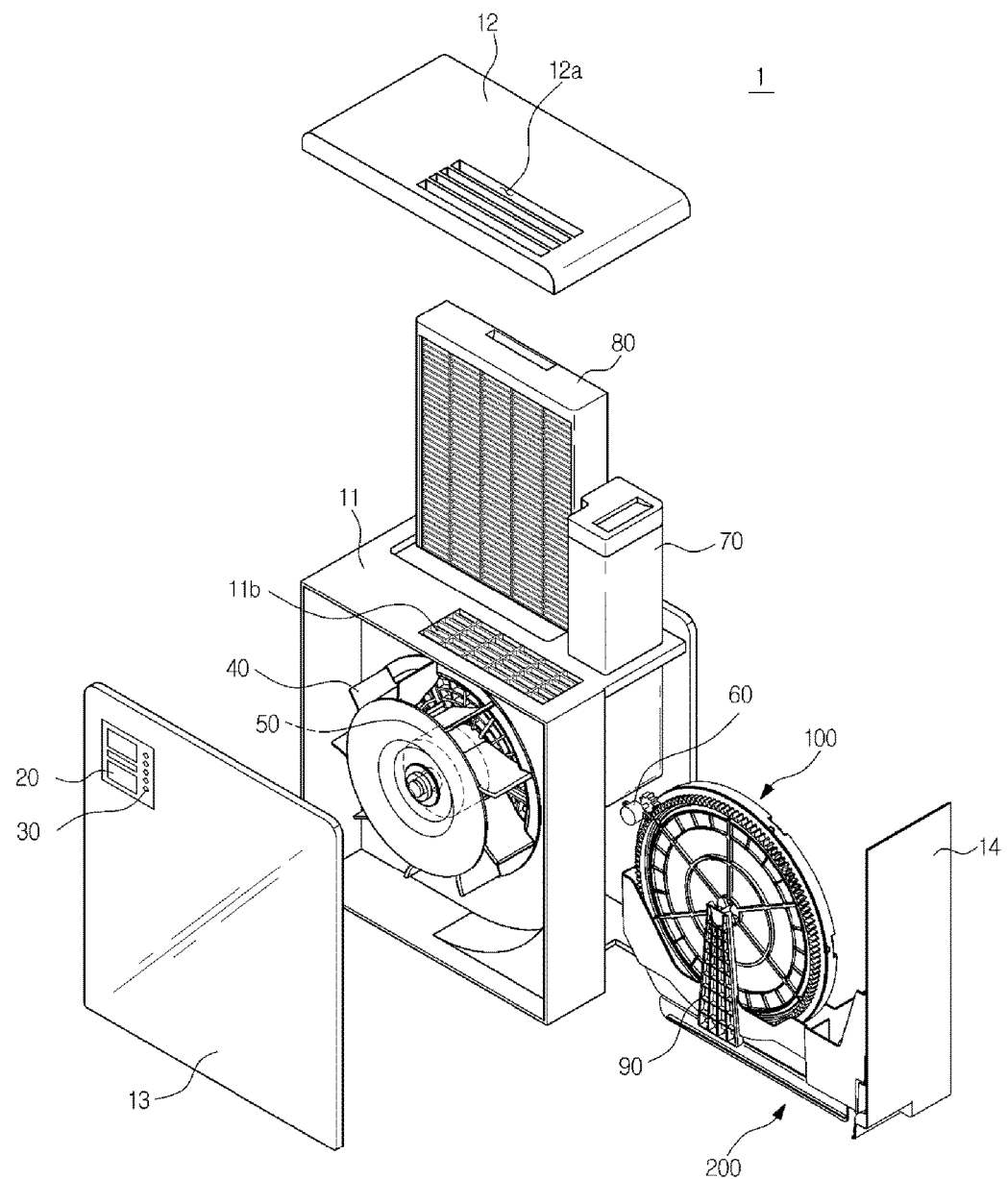
FIG. 3 is a front side exploded perspective view of the evaporative humidifier of FIG. 1.

FIG. 1 is a front side perspective view illustrating an evaporative humidifier according to an embodiment of the present disclosure, FIG. 2 is a rear side perspective view illustrating the evaporative humidifier of FIG. 1, and FIG. 3 is a front side exploded perspective view of the evaporative humidifier of FIG. 1.

Referring to FIGS. 1 to 3, an evaporative humidifier 1 according to an embodiment of the present disclosure includes a main body 10 forming the external appearance thereof, a blower fan 40 provided inside the main body 10 to forcedly blow air, a tub 200 provided inside the main body 10 to store water, and a humidifying element 100 rotatably provided inside the main body 10 to receive water from the tub 200 and evaporate the received water.

The main body 10 includes a main housing 11, a front cover 13 coupled to a front opening of the main housing 11, a side cover 14 coupled to a side opening of the main housing 11, and an upper cover 12 coupled to the upper surface of the main housing 11.

An inlet 11a through which indoor dry air is introduced into the main body 10 is provided on the rear surface of the main housing 11, and an outlet 11b through which humid air acquired by humidification of the inside of the main body 10 is discharged to an indoor space is provided on the upper surface of the main housing 11. A grill part 12a corresponding to the outlet 11b is provided on the upper cover 12.

Therefore, indoor dry air is introduced into the main body 10 through the inlet 11a of the main body 10, is humidified at the inside of the main body 10, and is then discharged to the outside through the outlet 11b of the main body 10.

Such forcible flow of air may be formed by the blower fan 40. In detail, the blower fan 40 may be a centrifugal fan. As the blower fan 40 is rotated by a first motor 50 to generate an air flow such that air moves from the rear side of the main body 10 to the upper side of the main body 10.

The front cover 13 is provided with a display part 20 to display various pieces of information of the evaporative humidifier 1 and an input part 30 to operate various functions of the evaporative humidifier 1.

The humidifying element 100 may be rotatably supported by a support frame 90. The humidifying element 100 may be rotated by rotary force transmitted from a second motor 60.

The support frame 90 is coupled to the tub 200. The humidifying element 100 may be separated from the support frame 90. After the side cover 14 is separated from the main housing 11, the tub 40 and the humidifying element 100 may be mounted into or separated from the main body 10 in the lateral direction. A detailed configuration of the humidifying element 100 will be described later.

Meanwhile, the evaporative humidifier 1 may further include a filter unit 80 to purify air introduced into the main body 10 and a water bucket 70 to supply water to the tub 200.

The water bucket 70 serves to store water required for humidification and to supply the tub 200 with a desired amount of water, and the water bucket 70 may be mounted into the evaporative humidifier 1 in a cassette scheme.

In this case, the water bucket 70 is provided at a lower portion thereof with a cap. The cap is configured to block a water passage at the time of being separated from the evaporative humidifier 1 and to open the water passage at the time of being mounted into the evaporative humidifier 1.

The filter unit 80 may include a dust collection filter, a deodorization filter, etc., and thus the evaporative humidifier 1 in accordance with the embodiment of the present disclosure may execute an air cleaning function. After the upper cover 12 is separated from the main body 10, the filter unit 80 and the water bucket 70 may be mounted into or separated from the main body 10 in the vertical direction.

Figure 4:
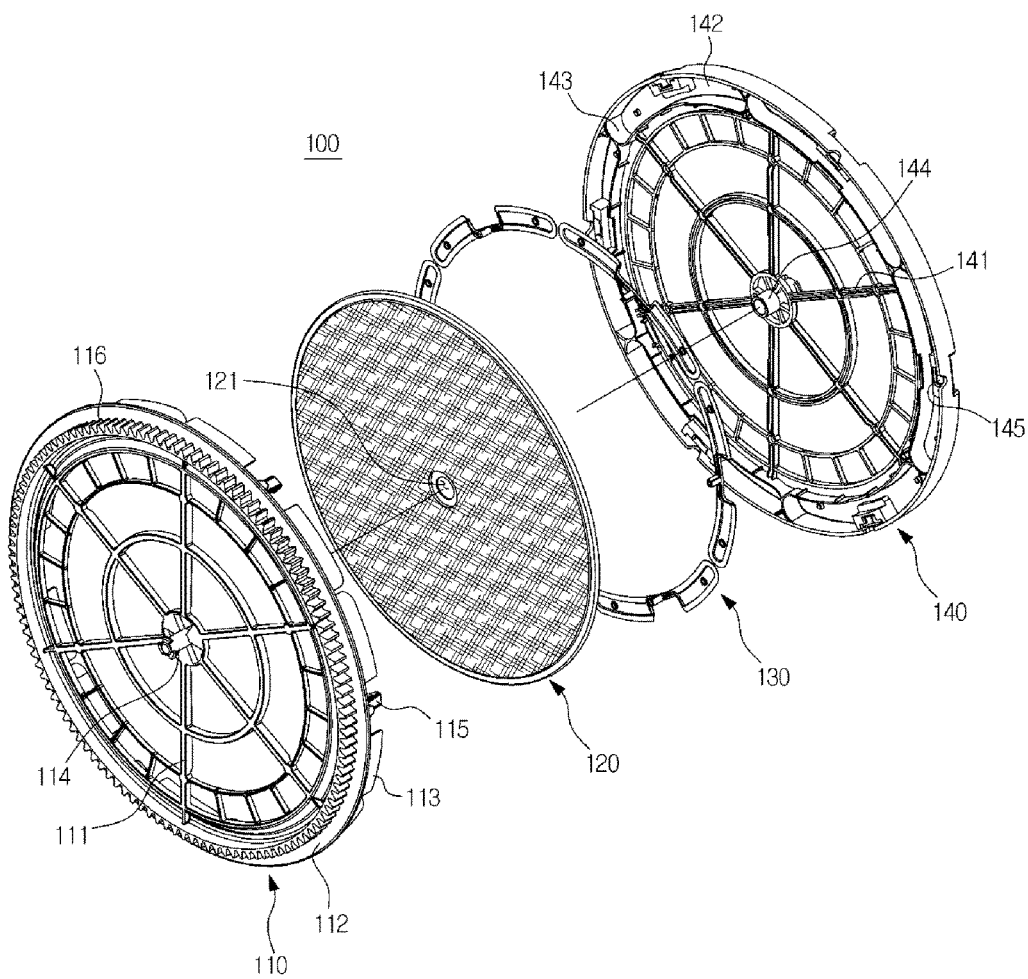
FIG. 4 is an exploded perspective view illustrating a humidifying element of the evaporative humidifier of FIG. 1.

Hereinafter, the configuration of the humidifying element will be described in detail with reference to FIGS. 4 and 5. FIG. 4 is an exploded perspective view illustrating a humidifying element of the evaporative humidifier of FIG. 1, and FIG. 5 is a cross sectional view illustrating a water pocket of the humidifying element of the evaporative humidifier of FIG. 1.

Figure 5:
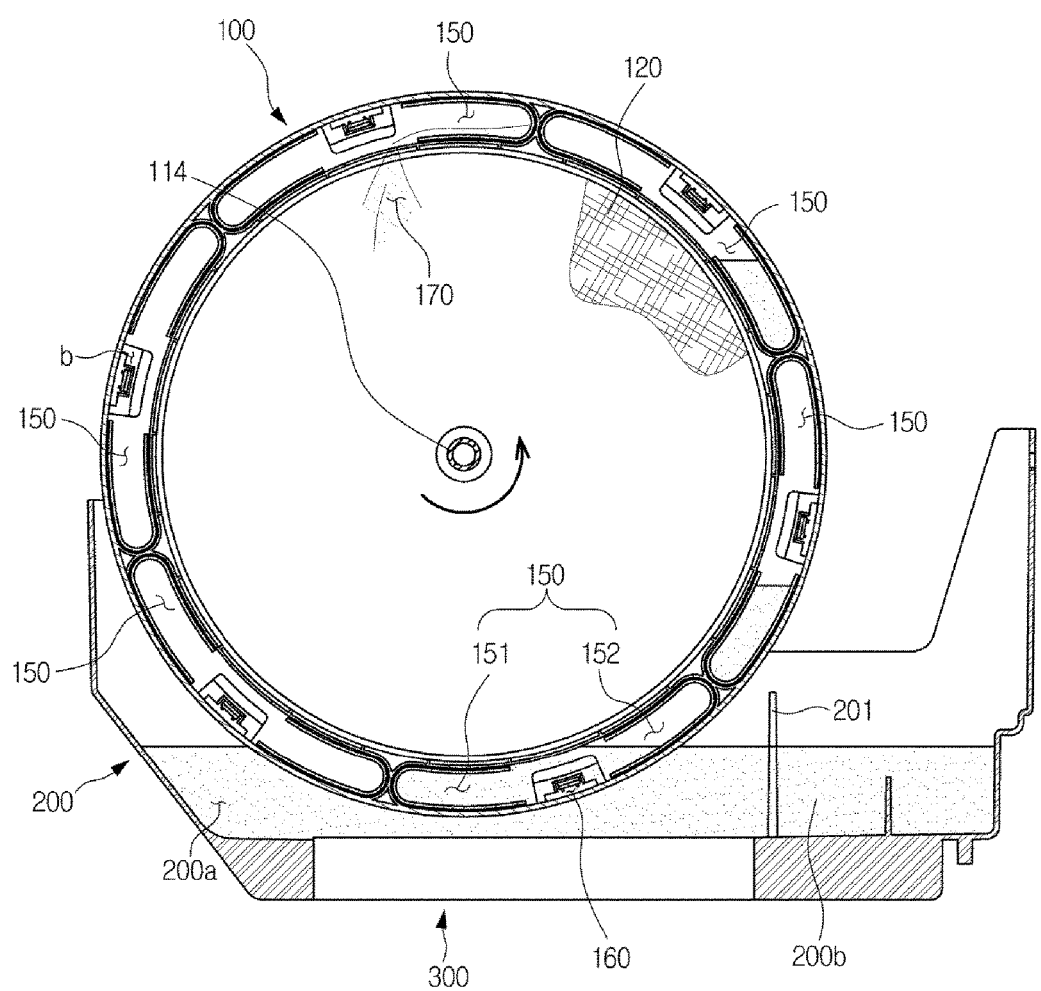
FIG. 5 is a cross sectional view illustrating a water pocket of the humidifying element of the evaporative humidifier of FIG. 1.

Referring to FIGS. 4 and 5, the humidifying element 100 includes a humidifying filter 120 absorbing water and then evaporating water, a first cover 110 and a second cover 140 respectively provided in front of and in the rear of the humidifying filter 120 so as to support the humidifying filter 120.

The humidifying filter 120 may be formed of fiber or paper, and provided in an approximate disc shape. The humidifying filter 120 receives water from a water pocket 150 formed between the first cover 110 and the second cover 140, and while holding the received water, performs humidification on the air passing through the humidifying filter 120.

In this case, impurities, such as dust contained in air, are filtered out by the humidifying filter 120, and only pure air may pass through the humidifying filter 120. Therefore, the humidifying filter 120 may execute a filtering function as well as a humidifying function.

The first cover 110 and the second cover 140 may respectively have an almost disc shape having a greater radius than the radius of the humidifying filter 120. The first cover 110 and the second cover 140 may be formed integrally formed through injection molding using a resin.

Rotary shafts 114 and 144 may be respectively provided on the first cover 110 and the second cover 120, and a through hole 121 through which the rotary shafts 114 and 144 pass may be provided on the humidifying filter 120. The rotary shafts 114 and 144 may be rotatably supported by the support frame 90.

A teeth part 116 is provided at the edge of the first cover 110, and thus the first cover 110 may receive rotary force transmitted from the second motor 60. However, differently from this embodiment, the teeth part 116 may be provided on the second cover 140.

The first cover 110 and the second cover 140 may support the humidifying filter 120 and form the water pockets 150 supplying water to the upper portion of the humidifying filter 120.

For this purpose, the first cover 110 may include a first support part 111 supporting the humidifying filter 120, and first water pocket formation parts 112 and 113 forming a portion of the water pocket 150.

The first support part 111 may be formed at the center of the first cover 110 in the radial direction in a size almost corresponding to the size of the humidifying filter 120, and have an almost spoke shape so that air may pass through the first cover 110.

The first water pocket formation parts 112 and 113 may be formed at the circumference of the first support part 111, and include a first horizontal wall part 112 almost horizontally extended from the first support unit 111 in the radial direction of the first cover 110 and a first vertical wall unit 113 protruding perpendicularly from the first horizontal wall part 112 in the backward direction.

In the same manner, the second cover 140 may include a second support part 141 supporting the humidifying filter 120, and second water pocket formation parts 142 and 143 forming the remaining portion of the water pocket 150.

The second support part 141 may be formed at the center of the second cover 140 in the radial direction in a size almost corresponding to the size of the humidifying filter 120, and have an almost spoke shape so that air may pass through the second cover 140.

The second water pocket formation parts 142 and 143 may be formed at the circumference of the second support part 141, and include a second horizontal wall part 142 almost horizontally extended from the second support part 141 in the radial direction of the second cover 140 and a second vertical wall part 143 protruding perpendicularly from the second horizontal wall part 142 in the backward direction.

The first cover 110 may include an elastic hook 115 protruding toward the second cover 140 to be coupled with the second cover 140, and the second cover 140 may include an insertion hole 145 into which the elastic hook 115 is inserted, so that the first cover 110 is coupled to the second cover 140 as the elastic hook 115 is inserted into the insertion hole 145.

The elastic hook 115 and the insertion hole 145 may be formed at the edges of the first cover 110 and the second cover 140.

In order to separate the first cover 110 and the second cover 140 from each other to wash and replace the humidifying filter 120, a pressure is applied to the elastic hook 115, and thus the first cover 110 and the second cover 140 may be separated from each other.

However, other coupling structures than the above-described coupling structure may be used as long as the first cover 110 and the second cover 140 may be separated from each other.

When the first cover 110 and the second cover 140 are coupled to each other, the first water pocket formation parts 112 and 113 of the first cover 110 and the second water pocket formation parts 142 and 143 of the second cover 140 may form the water pocket 150.

The water pocket 500 in accordance with the embodiment of the present disclosed is extended in the circumferential direction, differently from the conventional water pocket, is not protruded outwardly in the circumferential direction of the first cover 110 and the second cover 140, and is formed between the first cover 110 and the second cover 140 at the inside of the outermost edges of the first cover 110 and the second cover 140.

As shown in FIG. 5, the first water pocket formation parts 112 and 113 and the second water pocket formation parts 142 and 143 may form six water pockets 150. However, the number of the water pockets 150 is not limited thereto.

The water pocket 150 contains water in the tub 200 when the water pocket 150 is located at the lower portion of the humidifying element 100, carries the contained water as the water pocket 150 moves upwards, and drops the contained water by gravity when the water pocket 150 reaches the upper portion of the humidifying element 100, thereby supplying water to the upper portion of the humidifying filter 120.

In detail, water is introduced into the water pocket 150 through an entrance hole 160, and as the water pocket 150 moves upwards, water is supplied to the upper portion of the humidifying filter 120 through a dropping hole 170.

Since water supplied to the upper portion of the humidifying filter 120 slowly descends along the humidifying filter 120, evaporation may be generated throughout most regions of the humidifying filter 120.

Since the tub 200 is provided at a lower side of the humidifying element 100 to receive water from the water basket and store the received water. In this manner, water stored in the tub 200 is supplied to the humidifying element 100.

The tub 200 may include a water supply space 200b to which water is supplied from the water bucket 70 and a water storage space 200a configured to store water that is to be supplied to the humidifying element 100. The water supply space 200b is partitioned from the water storage space 200a by a partition wall 201. The partition wall 201 may be provided with a hole configured to supply the water storage space 200*a* with water received from the water supply space 200*b*.

The water supply space 200*b* may be provided with a protrusion configured to open a valve of the water bucket 70 when the water bucket 70 is mounted into the evaporative humidifier 1.

The tub 200 may be provided with a sterilization apparatus. In detail, the sterilization apparatus may be an ultraviolet ray emitting part 300 to emit ultraviolet rays to the tub 200. The ultraviolet ray emitting part 300 may sterilize the tub 200 by emitting ultraviolet rays to the water stored in the tub 200. In this case, the ultraviolet ray emitting part 300 is provided at a position lower than a water level of water accommodated in the tub 200, so that ultraviolet rays are directly emitted to the water accommodated in the tub 200.

As the ultraviolet rays are directly emitted to the water accommodated in the tub, the sterilization effect of the humidifier is maximized, and an area of the humidifier to be subject to an ultraviolet hardening prevention treatment is reduced. Details of the position of the ultraviolet ray emitting part will be described later.

Hereinafter, the structure and operation of the evaporative humidifier 1 will be described with reference to FIG. 6 in detail.

Figure 6:
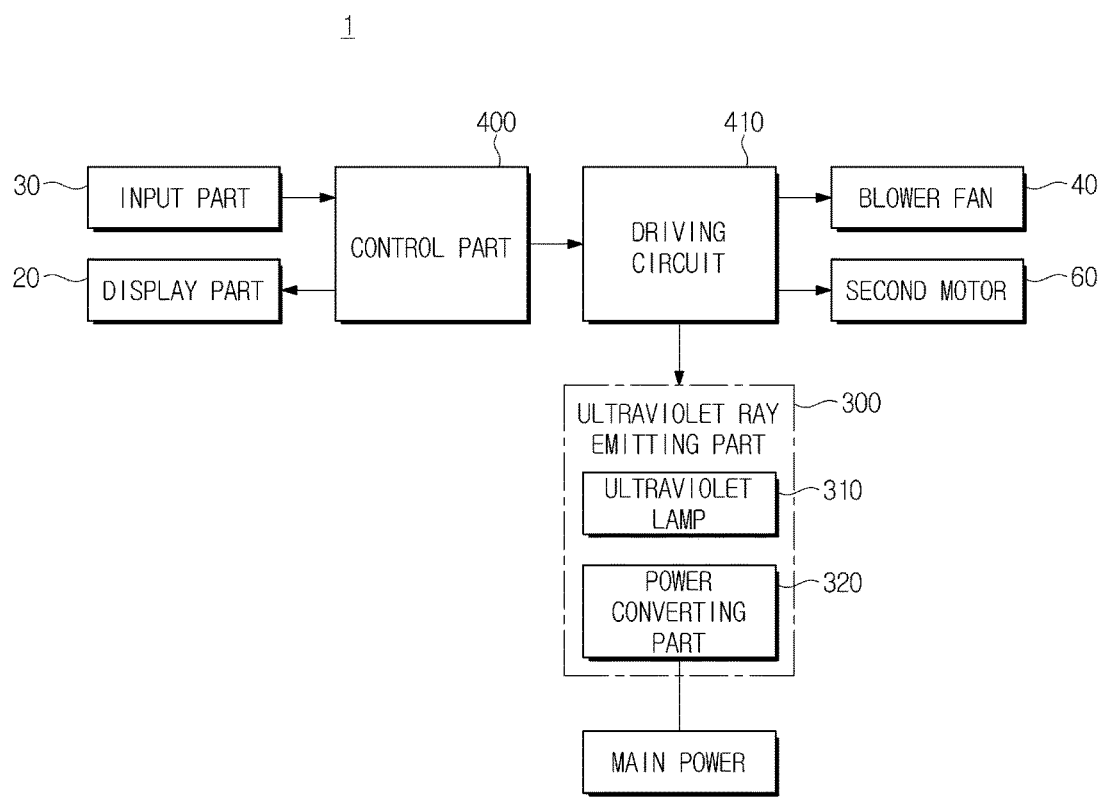
FIG. 6 is a control block diagram illustrating the evaporative humidifier of FIG. 1.

FIG. 6 is a block diagram illustrating the evaporative humidifier of FIG. 1.

Referring to FIG. 6, the evaporative humidifier 1 includes the input part 30 to receive a control command from a user, the display part 20 to display operation related information, the ultraviolet ray emitting part 300 to emit ultraviolet rays, a driving circuit 410 to operate the evaporative humidifier 1 according to control of a control part 400, and the control part 400 to perform an overall control on the evaporative humidifier 1.

The input part 30 may receive a control command from a user. As shown in FIG. 1, the input part 30 may be provided on the front cover 12 in a button type, but the implementation of the input part 30 is not limited thereto. It should be understood that the input part 30 may be provided using a dial, a switch and a touch pad, and includes all types of apparatus configured to generate electric signals corresponding to an input generated by a manipulation of a user, such as a pressing, contact, pressure and rotation.

The display part 20 may display information related to the evaporative humidifier 1. The display part 20 may be provided on the front cover 12 as shown in FIG. 1, but the implementation of the display part 20 is not limited thereto and the display part 20 may include display devices, such as LCD (Liquid Crystal Display), LED (Light Emitting Diodes), OLED (Organic Light Emitting Diodes), AMO-LED (Active Matrix Organic Light Emitting Diodes), a flexible display, and a 3D display.

The ultraviolet ray emitting part 300 may include an ultraviolet lamp 310 to generate ultraviolet rays and a power converting part 320 to supply an alternating current power to the ultraviolet lamp 310. Hereinafter, the structure and operation of the ultraviolet ray emitting part 300 will be described in detail.

Figure 7A:
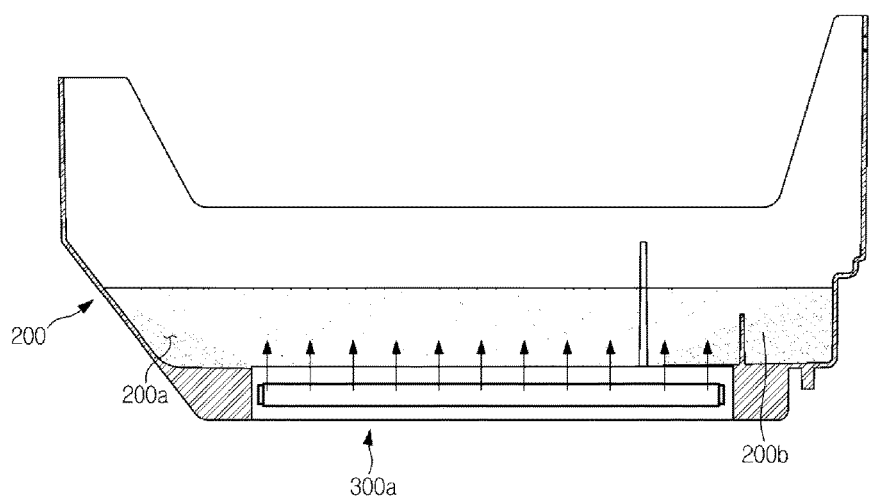
FIGS. 7A. 7B and 7C are schematic views illustrating a tub provided with an ultraviolet ray emitting part according to embodiments of the present disclosure.
Figure 7B:
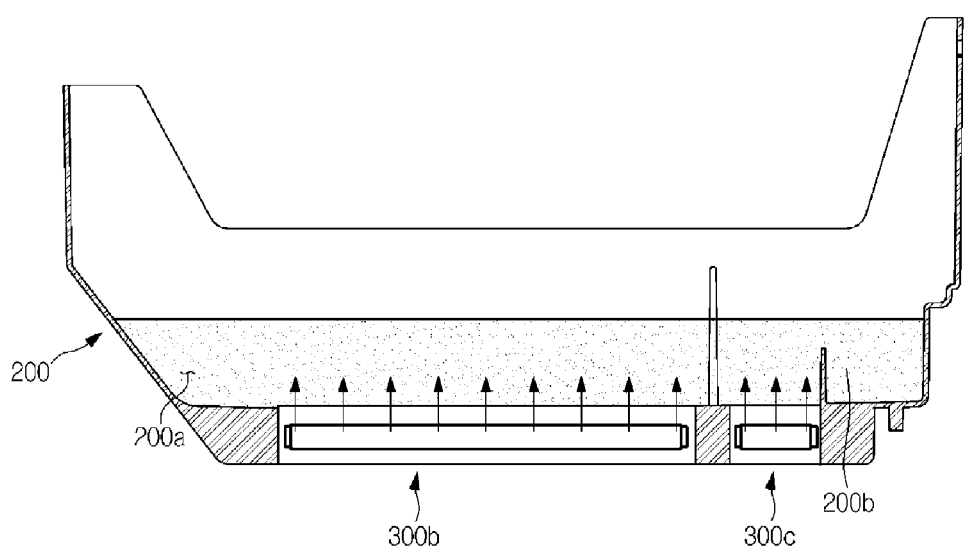
Figure 7C:
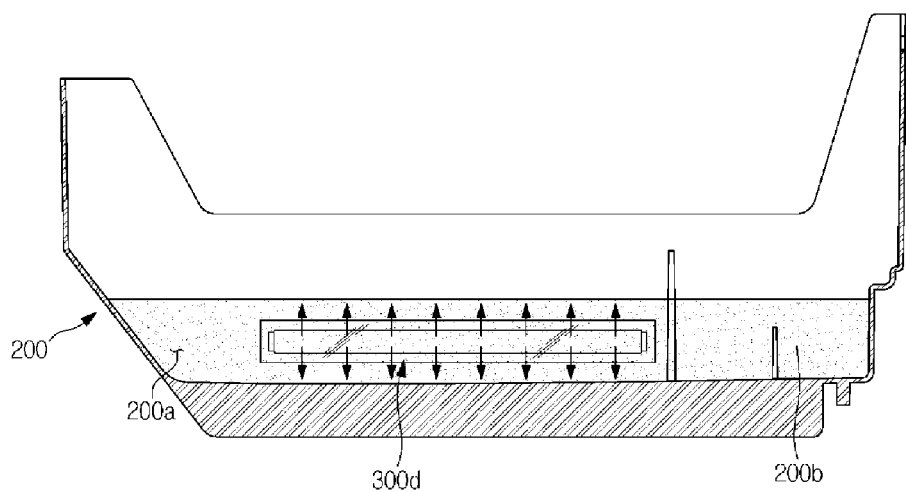
Figure 8:
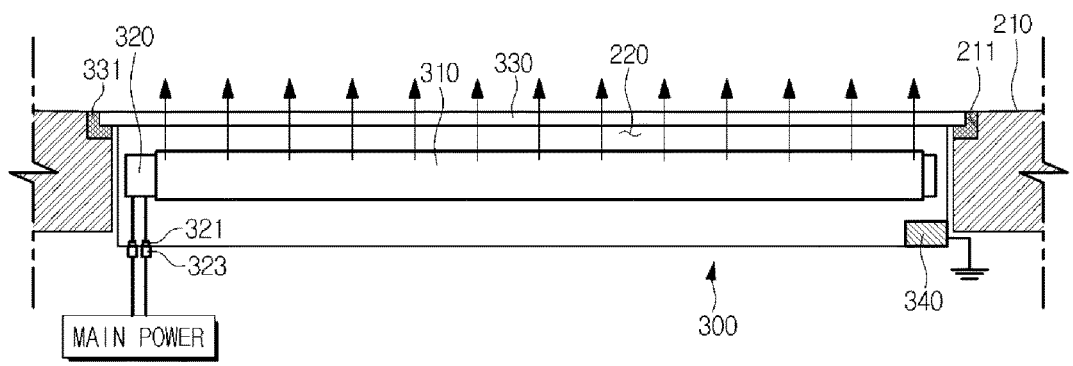
FIG. 8 is a cross sectional view illustrating an ultraviolet ray emitting part according to an embodiment of the present disclosure.
Figure 9:
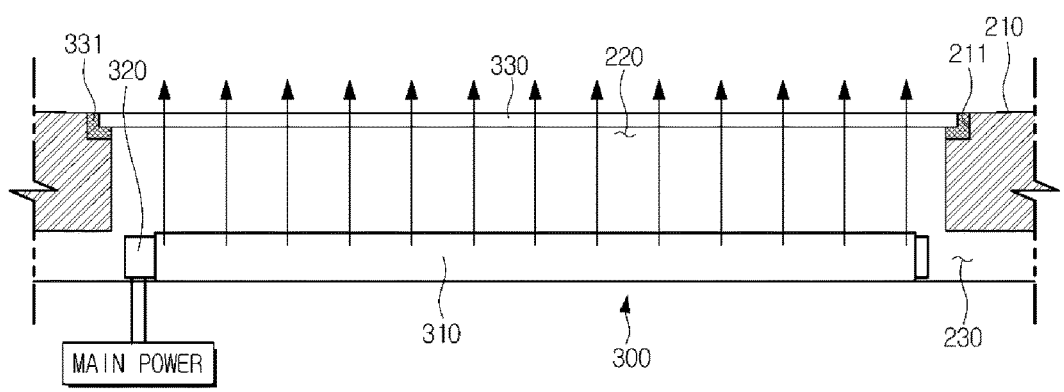
FIG. 9 is a cross sectional view illustrating an ultraviolet ray emitting part according to another embodiment of the present disclosure.
Figure 10A:
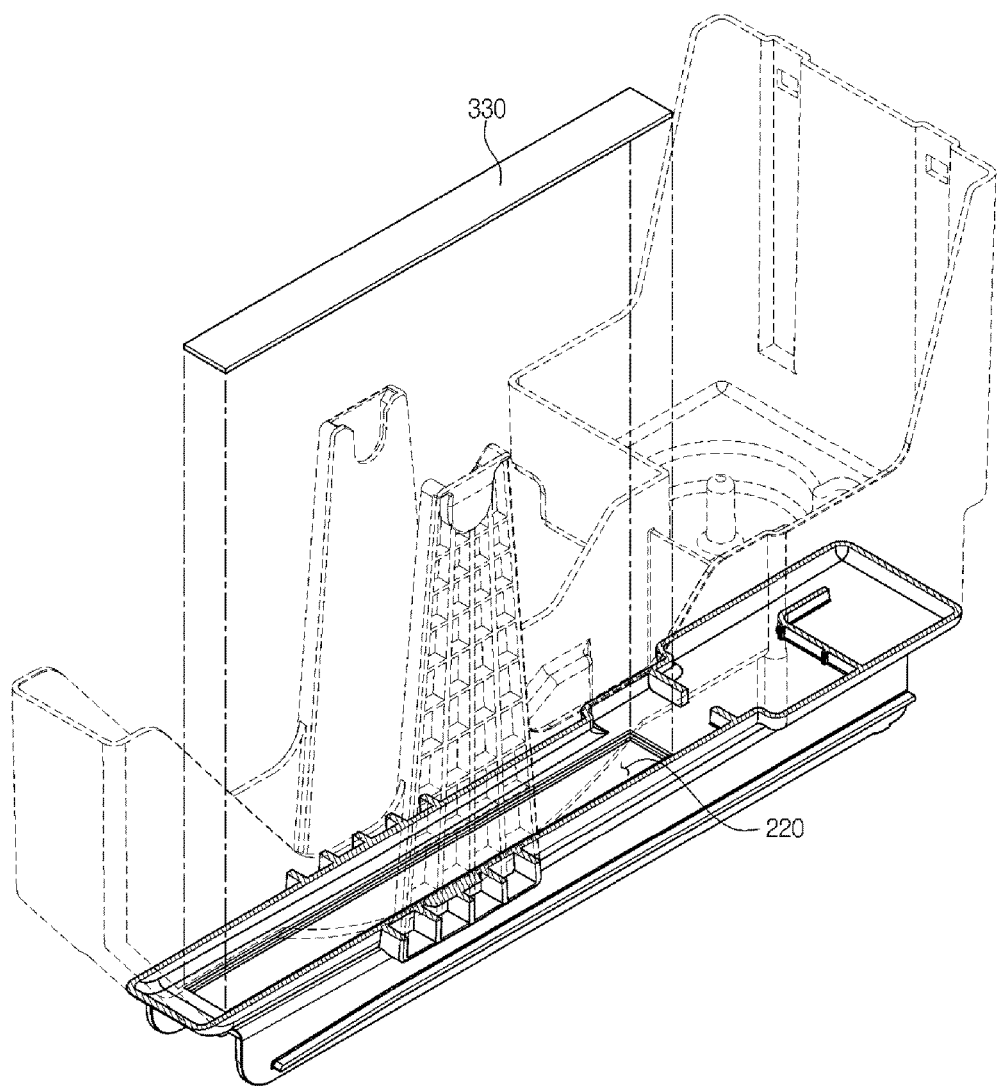
FIGS. 10A, 10B and 10C are perspective views illustrating a water blocking part of an ultraviolet ray emitting part according to embodiments of the present disclosure.
Figure 10B:
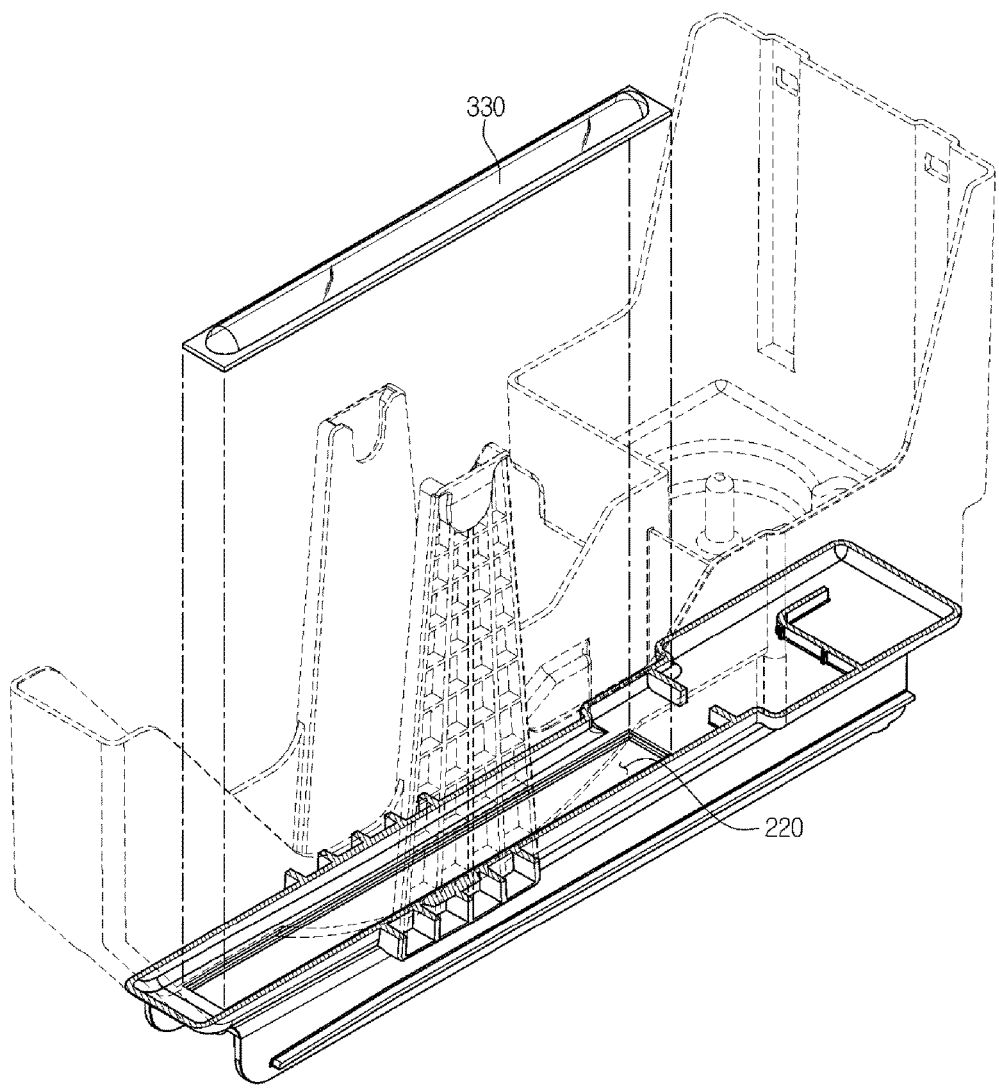
Figure 10C:
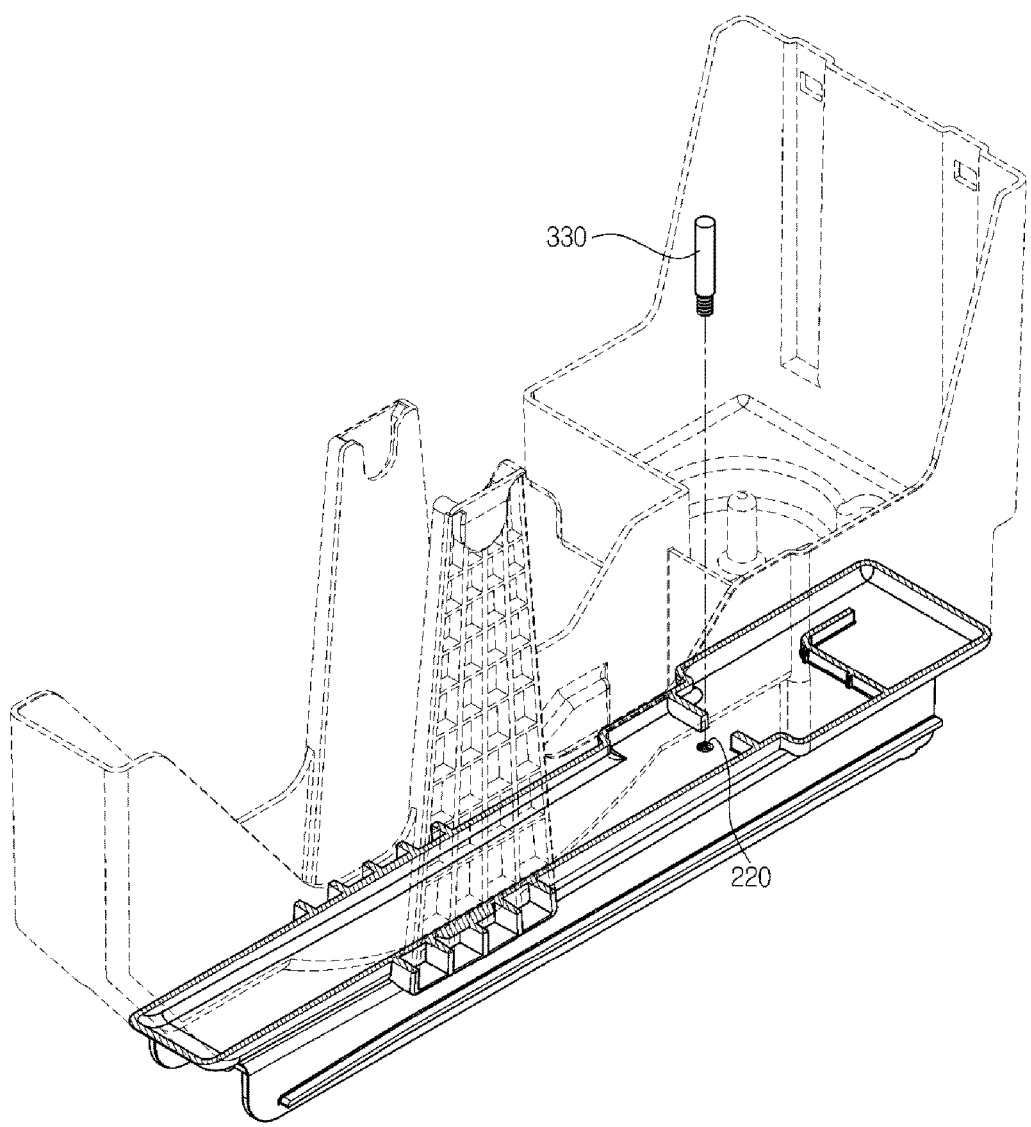
Figure 11:
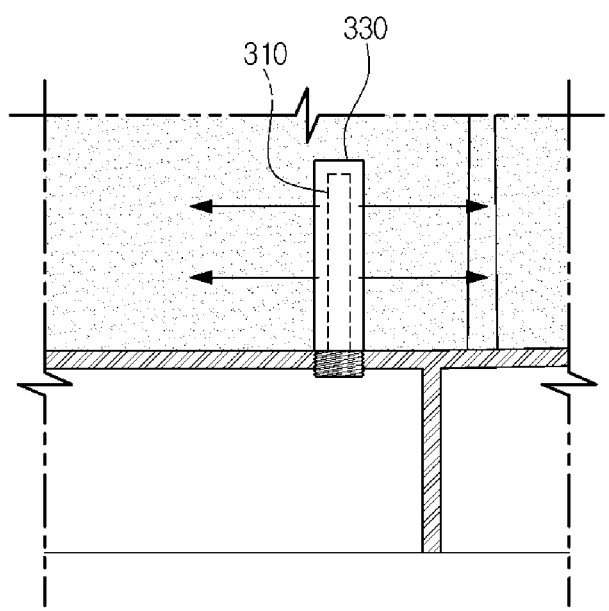
FIG. 11 is a cross sectional view illustrating an ultraviolet ray emitting part according to still another embodiment of the present disclosure.

FIGS. 7A, 7B and 7C are schematic views illustrating a tub provided with an ultraviolet ray emitting part according to embodiments of the present disclosure, FIG. 8 is a cross sectional view illustrating an ultraviolet ray emitting part according to an embodiment of the present disclosure, FIG. 9 is a cross sectional view illustrating an ultraviolet ray emitting part according to another embodiment of the present disclosure, FIGS. 10A, 10B and 10C are perspective views illustrating a water blocking part of an ultraviolet ray emitting part according to embodiments of the present disclosure, and FIG. 11 is a cross sectional view illustrating an ultraviolet ray emitting part according to still another embodiment of the present disclosure.

As shown in FIG. 5, the ultraviolet ray emitting part 300 is provided on a lower surface of the water storage space 200*a* to emit ultraviolet rays toward the tub 200. To this end, an opening 220 is provided on the lower surface of the water storage space 200*a* to accommodate the ultraviolet ray emitting part 300, and the opening 220 is provided in a shape corresponding to that of the ultraviolet ray emitting part 300.

Although the ultraviolet ray emitting part 300 shown in FIG. 5 is illustrated as being provided on the lower surface of the water storage space 200*a*, the implementation thereof is not limited thereto. For example, referring to FIG. 7A, a ultraviolet ray emitting part 300*a* may be provided throughout a lower surface of the water storage space 200*a* and a lower surface of the water supply space 200*b*, or may be provided adjacent to the partition wall 201 to sterilize the water storage space 200*a* and the water supply space 200*b* at the same time.

In addition, referring to FIG. 7B, ultraviolet ray emitting parts 300*b* and 300*c* may be provided on the water storage space 200*a* and the water supply space 200*b*, respectively. When the ultraviolet ray emitting part is provided in plurality, the plurality of ultraviolet ray emitting parts may be individually operated.

In addition, the position of the ultraviolet ray emitting part 300 is not limited as long as it is positioned lower than the water level of water accommodated in the tub. For example, referring to FIG. 7C, an ultraviolet ray emitting part 300*d* may be provided on one side wall of the tub to directly emit ultraviolet rays to the water accommodated in the water. In case the ultraviolet ray emitting part 300*d* is provided on one side wall of the tub, the ultraviolet ray emitting part 300*d* may be provided at a position lower than the water level of water accommodated in the tub such that ultraviolet rays are directly radiated to the water accommodated in the tub.

The following description will be made in relation that the ultraviolet ray emitting part 300 is provided on the lower surface of the water storage space 200*a*.

Referring to FIG. 8, a lower surface 210 of the tub is provided with an opening 220 formed therethrough to emit ultraviolet rays generated from the ultraviolet ray emitting part 300. The opening 200 is provided in a size corresponding to that of the ultraviolet ray emitting part 300. The size of the ultraviolet ray emitting part 300 is not limited, but may be provided in a size of 10% to 90% of an area of the lower surface 210 of the tub to ensure efficient sterilization.

In addition, the opening 220 may further include a mounting part 211 formed toward an inner side of the opening 220. The mounting part 211 protrudes to an inner side of the opening 220 along a lower edge of the opening 220. The mounting part 211 may be subject to a ultraviolet hardening prevention treatment, or may be formed of material having ultraviolet resistant material, such as aluminum.

Referring to FIG. 8, the mounting part 211 is integrally formed with the opening 220. However, according to another embodiment of the present disclosure, the mounting part 211 may be separately formed from the opening 220 and coupled to an edge of the opening 220.

Meanwhile, although the mounting part 211 shown in FIG. 8 is illustrated as having a portion stepped from the opening 220, the implementation thereof is not limited and may be provided in various structures. The implementation of the mounting part will be described in detail.

The ultraviolet lamp 310 may be provided inside the ultraviolet ray emitting part 300. The ultraviolet lamp 310 may generate light having a very short wavelength (for example, 400 nm or lower) by receiving power. In detail, the ultraviolet lamp 310 may include a plurality of lamps spaced apart from each other and a sealed housing.

The plurality of electrodes may be provided in the sealed housing. Each electrode may be formed of material efficiently emitting thermal electrons and having a high melting point, such as, tungsten, or formed of material having a low thermo electron emission coefficient, such as barium oxide, yttrium oxide, strontium oxide, and kalium oxide.

The housing may be provided in a tube shape, but the configuration thereof is not limited and may be provided in various shapes. For example, the housing may be provided in a U shape or a W shape. In addition, the housing may be formed of ultraviolet ray transmitting material, for example, quartz.

The housing is provided at an inside thereof with light emitting material, such as mercury, metal halides and buffer gas, for example, Ar, Xe and He, so that ultraviolet rays are generated when an alternating current power is applied to each electrode.

The power converting part 320 converts a main power, which is a direct current, of the evaporative humidifier 1 into an alternating current power, and applies the converted alternating current power to the ultraviolet lamp 310. The power converting part 320 may further include an inverter.

The power converting part 320 may further include a first terminal 321 exposed to the outside of the ultraviolet ray emitting part. The first terminal 321 is electrically connected to the power converting part 320, and when the ultraviolet ray emitting part 300 is accommodated in the tub 200, the first terminal 321 makes contact with a second terminal 323. Therefore, when the second terminal 323 electrically connected to the main power makes contact with the first terminal 321, a direct current power is applied to the power converting part 320. The first terminal 321 and the second terminal 323 may be formed of material having a high conductivity.

Meanwhile, a water blocking part 330 may be provided on an upper portion of the ultraviolet ray emitting part 300 making contact with the water of the tub 200.

The water blocking part 330 is mounted on the opening 220. In this case, the water blocking part 330 is provided in a shape corresponding to that of the opening 220 to prevent water of the tub 200 from being introduced into the ultraviolet ray emitting part 300.

In addition, the water blocking part 330 may be formed of material allowing ultraviolet rays to pass therethrough such that ultraviolet rays generated from the ultraviolet lamp 310 are introduced into the tub 200. The ultraviolet rays generated from the ultraviolet lamp 310 are emitted to the tub 200 after passing through the water blocking part 330.

For example, the water blocking part 330 may be formed of material having a high resistance to ultraviolet rays and allowing ultraviolet rays to pass therethrough, such as polypropylene (PP) and Teflon.

A water leakage preventing part 331 may be provided between the water blocking part 330 and the mounting part 211. The water leakage preventing part 331 is provided between the water blocking part 330 and the mounting part 211 to prevent water from leaking between the water blocking part 330 and the mounting part 211. In this case, the water leakage part 331 may include one of rubber sealing, waterproof tape, waterproof silicon or waterproof adhesive.

Meanwhile, the mounting part 211 protruding to an inner side of the opening 220 prevents the ultraviolet rays emitted from the ultraviolet lamp 310 from being directly emitted to the water leakage preventing part 331. Accordingly, the mounting part 211 prevents the water leakage preventing part 331 from being hardened.

The ultraviolet ray emitting part 300 may further include a ground terminal 340 to prevent a short circuit. The ground terminal 340 may be electrically connected to the ground, and prevent a short circuit from occurring due to water introduced.

Meanwhile, although the ultraviolet ray emitting part 300 shown in FIG. 8 is illustrated as being provided as an independent module and provided on a lower surface of the opening 220, the configuration of the ground terminal 340 is not limited thereto. For example, an accommodating part 230 may be provided at a lower portion of the tub 200 to accommodate the ultraviolet ray emitting part 300.

For example, referring to FIG. 9, the accommodating part 230 may be provided at the lower portion of the tub 200. In this case, the opening 220 may be formed on the upper side of the accommodating part 230. The ultraviolet ray emitting part 300 and the power converting part 320 may be provided inside the accommodating part 230. Although the power converting part 320 as shown in FIG. 8 is electrically connected to the main power through the first terminal 321 and the second terminal 323, the implementation thereof is not limited. For example, as shown in FIG. 9, the power converting part 320 may be electrically connected to the main power without an additional terminal.

Meanwhile, although the water blocking part 330 shown in FIGS. 1 to 9 is illustrated as having a plate shape, and forming the lower surface 210 of the tub by being coupled to the opening 220 (see FIG. 10A), the configuration of the water blocking part 330 is not limited thereto. The water blocking part 330 may be provided in various forms depending on the shape and disposition of the ultraviolet lamp 310.

In addition, the water blocking part 330 may be provided to protrude inward the tub 200 to sterilize the entire area of the tub 200. For example, referring to FIGS. 10B and 10C, the water blocking part 330 may be provided in a shape of a tub or cylinder protruding inward the tub 200.

In addition, the shapes or dispositions of other parts of the ultraviolet ray emitting part 300 may be also changed depending on the shape of the water blocking part 330.

Referring to FIG. 11, the ultraviolet ray emitting part 300 may be provided in a cylinder shape corresponding to a shape of the water blocking part 330. A screw thread is provided on a lower portion of the water blocking part 330 to be coupled to the opening 220. Depending on the shape of the water blocking part 330, the ultraviolet lamp 310 may be provided perpendicular to the lower surface 210 of the tub as shown in a dotted line.

In this case, the opening 220 may be provided in a circular shape corresponding to a shape of the ultraviolet ray emitting part 300, and a screw thread may be provided on the edge of the opening 220 so as to be coupled to the screw thread of the ultraviolet ray emitting part 300.

In addition, a water leakage preventing part (not shown) may be provided between the water blocking part 330 and the screw thread formed on the edge of the opening 220.

As described above, the ultraviolet ray emitting part 300 is disposed on the lower surface 210 of the tub 200 to sterilize the water in the tub 200, thereby preventing proliferation of microorganisms and germs.

In addition, ultraviolet rays are collectively emitted to the tub 200, that is, a portion being likely to have the largest proliferation of germs in the evaporative humidifier, so that a portion needing to be subject to an ultraviolet hardening prevention treatment is reduced, thereby saving the manufacturing cost of the evaporative humidifier 1.

The driving circuit 410 supplies power such that the evaporative humidifier 1 operates according to a control signal of the control part 400. In detail, the driving circuit 410 may supply power to the motors 50, 60 and the ultraviolet ray emitting part 300 to operate the motors 50, 60 and the ultraviolet ray emitting part 300 according to a control part of the control part 400.

The motors 50 and 60 may be provided using a universal motor including a field coil and an armature, or a brushless direct motor including a permanent magnet and an electromagnet. Other motors may be used than the above-identified motor as long as it is applicable to a small-middle type drum.

The driving circuit 410 may adjust the RPM and rotation directions of the motors 50 and 60 by adjusting the magnitude and direction of electric current applied to the motors 50 and 60.

The control part 400 controls an overall operation on the evaporative humidifier 1. The control part 400 may control the driving circuit 410 such that a humidification operation and a sterilization operation are performed.

The control part 400 may perform a humidification operation by controlling the driving circuit 410 such that dry air is humidified while passing through the humidifying filter 120 having received water from the rotating water pocket 150 and then is discharged through the outlet 11b of the main body 10. In this case, the control part 400 may control the degree of humidification by controlling the motors 50 and 60 that rotate the blower fan 40 and the water pocket 150.

In addition, the control part 400 may perform a sterilization operation by controlling the driving circuit 410 such that ultraviolet rays are emitted to the tub 200. The sterilization operation may be performed together with the humidification operation in various methods. Details thereof will be described later.

Meanwhile, the control part 400 may be provided using one or more processors. In this case, the processor may be implemented as an array including a plurality of logic gates, and as a combination of a microprocessor and a memory storing a program executed by the microprocessor. The implementation of the control part 400 is not limited thereto, the control part 400 may be implemented using other types of hardware.

Figure 12:
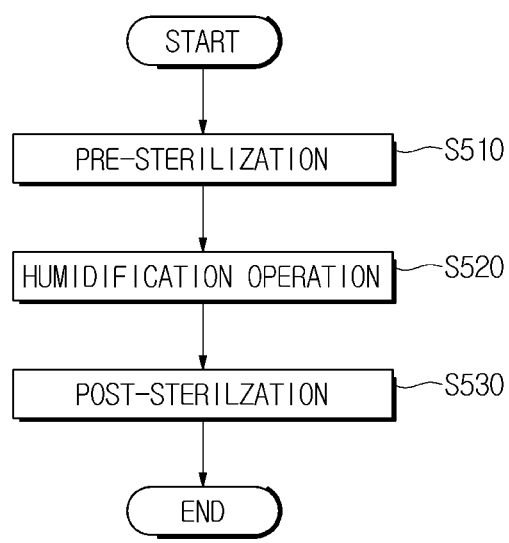
FIG. 12 is a flow chart showing a method of controlling an evaporative humidifier according to an embodiment of the present disclosure.

FIG. 12 is a flow chart showing a method of controlling an evaporative humidifier according to an embodiment of the present disclosure. Hereinafter, a sterilization operation of the evaporative humidifier 1 according to an embodiment of the present disclosure will be described with reference to FIG. 12.

Referring to FIG. 12, the control part 400 may perform a pre-sterilization operation (510). Water may remain in the tub 200 after the humidification operation is completed, and germs or microorganisms may exist in the remaining water. Accordingly, the pre-sterilization operation is performed before a humidification operation starts, to ensure a hygienic humidification operation.

In detail, the pre-sterilization operation represents a sterilization operation performed before a humidification operation starts, and the control part 400 controls the evaporative humidifier 1 such that ultraviolet rays are emitted to the tub 200 for a predetermined time before a humidification operation starts. In this case, the predetermined time may be determined by a user, for example, 1 minute or shorter.

The control part 400 performs a humidification operation after the pre-sterilization operation is completed (520). In this case, a humidification operation and a sterilization operation are simultaneously performed. For example, the control part 400 may simultaneously perform a sterilization operation and a humidification operation by continuously emitting ultraviolet rays to the water in the tub 200 while performing a humidification operation.

When the sterilization operation is completed, the control part 400 may perform a post-sterilization operation (530). As the post-sterilization operation is performed after the humidification operation is completed, water accommodated in the tub 200 is sterilized, thereby minimizing proliferation of germs and microorganisms in the remaining water.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An evaporative humidifier comprising:
   a water bucket;
   a tub configured to accommodate water introduced from the water bucket;
   a humidifying element configured to execute humidification by receiving the water accommodated in the tub and evaporating the received water; and
   an ultraviolet ray emitting part provided on the tub to emit ultraviolet rays to the tub, the ultraviolet ray emitting part being provided at a position lower than a water level of the water accommodated in the tub,
   wherein the tub is provided at an inside lower surface thereof with an opening to accommodate the ultraviolet ray emitting part,
   the ultraviolet ray emitting part further includes a water blocking part formed to correspond to the opening, the water blocking part allowing the ultraviolet rays to pass therethrough and preventing the water accommodated in the tub from being introduced into the ultraviolet ray emitting part,
   the opening includes an mounting part having a step and extending to an inner side of the opening such that the water blocking part is mounted on the mounting part;
   the ultraviolet ray emitting part further includes a water leakage preventing part configured to prevent water from leaking between a gap between the mounting part and the water blocking part, and
   the mounting part is configured to prevent the ultraviolet rays from being directly emitted to the water leakage preventing part.

2. The evaporative humidifier of claim 1, wherein the ultraviolet ray emitting part is provided on a lower surface of the tub.

3. The evaporative humidifier of claim 1, wherein the water blocking part is provided in a plate shape to form the inside lower surface of the tub by being coupled to the opening.

4. The evaporative humidifier of claim 1, wherein the water blocking part is provided in a protruding shape protruding inwardly into the tub.

5. The evaporative humidifier of claim 3, wherein the water blocking part is provided in a protruding tube shape protruding inwardly into the tub.

6. The evaporative humidifier of claim 4, wherein the opening is provided in a circular shape, and the water blocking part is provided in a cylinder shape, so that the water blocking part is screw-coupled to the opening.

7. The evaporative humidifier of claim 1, wherein the tub includes a partition part configured to partition a water supply space to which water is supplied from the water bucket from a water storage space configured to supply water to the humidifying element.

8. The evaporative humidifier of claim 7, wherein the ultraviolet ray emitting part emits ultraviolet rays to at least one of the water supply space and the water storage space.

9. The evaporative humidifier of claim 7, wherein the ultraviolet ray emitting part is provided adjacent to the partition part.

10. The evaporative humidifier of claim 1, wherein the ultraviolet ray emitting part further includes an ultraviolet lamp and a power converting part configured to supply an alternating current power to the ultraviolet lamp.

11. The evaporative humidifier of claim 10, wherein the ultraviolet ray emitting part further includes at least one ground terminal configured to prevent a short circuit.

12. The evaporative humidifier of claim 1, further comprising a control part configured to control the ultraviolet ray emitting part such that ultraviolet rays are emitted to the water accommodated in the tub before a humidification operation of the evaporative humidifier starts.

13. The evaporative humidifier of claim 1, further comprising a control part configured to control the ultraviolet ray emitting part such that ultraviolet rays are emitted to the water accommodated in the tub after a humidification operation of the evaporative humidifier is completed.

14. The evaporative humidifier of claim 1, further comprising a control part configured to control the ultraviolet ray emitting part such that ultraviolet rays are emitted to the water accommodated in the tub at a constant interval during a humidification operation of the evaporative humidifier.

* * * * *